(12) United States Patent
Bassis

(10) Patent No.: US 10,260,617 B2
(45) Date of Patent: Apr. 16, 2019

(54) TRANSMISSION PACKAGING FOR AN EPICYCLIC/PLANETARY GEARBOX UNIT WITH INTEGRATED OIL PUMP

(71) Applicant: NIO USA, Inc., San Jose, CA (US)

(72) Inventor: Dimitri Bassis, Menlo Park, CA (US)

(73) Assignee: NIO USA, Inc., San Jose, CA (US)

( * ) Notice: Subject to any disclaimer, the term of this patent is extended or adjusted under 35 U.S.C. 154(b) by 90 days.

(21) Appl. No.: 15/365,427

(22) Filed: Nov. 30, 2016

(65) Prior Publication Data

US 2018/0112767 A1    Apr. 26, 2018

Related U.S. Application Data

(60) Provisional application No. 62/411,303, filed on Oct. 21, 2016.

(51) Int. Cl.
| | |
|---|---|
| *F16H 57/04* | (2010.01) |
| *F16H 1/28* | (2006.01) |
| *F04C 2/10* | (2006.01) |
| *F16H 57/12* | (2006.01) |
| *F04C 15/00* | (2006.01) |

(52) U.S. Cl.
CPC ......... *F16H 57/0486* (2013.01); *F04C 2/102* (2013.01); *F04C 15/008* (2013.01); *F04C 15/0076* (2013.01); *F16H 1/28* (2013.01); *F16H 57/0427* (2013.01); *F16H 57/0436* (2013.01); *F16H 57/12* (2013.01)

(58) Field of Classification Search
CPC .... F16H 1/28; F16H 57/0427; F16H 57/0436; F16H 57/0486; F04C 2/102
See application file for complete search history.

(56) References Cited

U.S. PATENT DOCUMENTS

| | | | |
|---|---|---|---|
| 8,353,797 B2 | 1/2013 | Burgman et al. | |
| 2003/0032517 A1* | 2/2003 | Keiser | F16H 3/722 475/91 |
| 2007/0107960 A1* | 5/2007 | Takami | B60K 6/365 180/65.6 |

\* cited by examiner

*Primary Examiner* — Mark J Beauchaine
(74) *Attorney, Agent, or Firm* — Sheridan Ross P.C.

(57) ABSTRACT

Packaging for transmissions with an epicyclic gearbox speed reducer and oil pump is provided. Packaging comprises an epicyclic/planetary gearbox or single stage gear reducer with a sun gear, ring unit, and one or more planetary gears on the ring unit, and an oil pump located inside the packaging. The oil pump may be driven directly by a carrier, or driven by a carrier using a gear stage set. This configuration provides a tighter packaging of the full assembly of an epicyclic/planetary gearbox for transmissions with an internal oil pump, which reduces the weight of the unit, provides lubrication, and avoids splashing. The pump packaging may also be particularly valuable for electric vehicle ("EV") independent motor applications.

20 Claims, 5 Drawing Sheets

TRANSMISSION PACKAGING FOR AN EPICYCLIC/PLANETARY GEARBOX UNIT WITH INTEGRATED OIL PUMP

CROSS REFERENCE TO RELATED APPLICATION

The present application claims the benefits of and priority, under 35 U.S.C. § 119(e), to U.S. Provisional Application Ser. No. 62/411,303, filed Oct. 21, 2016, entitled "TRANSMISSION PACKAGING FOR AN EPICYCLIC PLANETARY GEARBOX UNIT WITH INTEGRATED OIL PUMP DRIVEN BY THE PLANETARY GEAR CARRIER ASSEMBLY," for which the entire disclosure is hereby incorporated by reference, in its entirety, for all that it teaches and for all purposes.

FIELD OF INVENTION

The present disclosure relates generally to packaging of a transmission, and more specifically to packaging of a transmission for an epicyclic/planetary gearbox with an integrated oil pump, as a speed reducer.

BACKGROUND

Modern automatic transmissions in automobiles may utilize an epicyclic/planetary gearbox to transfer power and function as a speed reduction unit. This epicyclic/planetary gearbox unit is composed of a sun gear driven by the input shaft of the transmission, multiple planetary gears that intermesh with the sun gear and are spatially arranged around the periphery of the sun gear, and an internal ring gear that intermeshes with and surrounds the multiple planet gears. The ring gear is generally the fixed member of the epicyclic/planetary transmission system. The multiple planetary gears are mounted to a carrier that in turn is operatively connected to the output shaft of the transmission. Vehicles possessing this configuration usually do not include an oil pump. When an oil pump is included, however, it is external to the epicyclic/planetary gearbox packaging.

Epicyclic/planetary gear reducers with the aforementioned packaging present several drawbacks. One drawback is that the gearbox or main rotor gear transmission is normally extremely heavy for a single subsystem. This is partially due to the oil pump being external to the epicyclic/planetary gearbox and therefore being less compact.

In addition, epicyclic gear reducers require lubrication to reduce friction and provide protection from wear for gear teeth, bearing surfaces, and other contact surfaces in relative motion. The planet gears submerge into a lubricant during revolution around the coaxial shaft of the transmission. Thanks to the revolution and the rotation of the planetary gears, the gears submerge into lubricant at a high tangential speed by some constructions. The wheel-body this hits the lubricant surface and accelerates the oil getting in its tooth valleys. Under this configuration, however, splashing may occur, which increases friction loss.

Thus, it is advantageous to provide a tighter packaging of the full assembly of an epicyclic/planetary gearbox with an internal integrated oil pump for transmissions, to reduce the weight of the unit, provide better lubrication, and avoid splashing.

SUMMARY

The present invention provides a packaging for a transmission with an epicyclic/planetary gearbox and an internal integrated oil pump. The packaging may comprise an epicyclic/planetary gearbox having a sun gear, a planetary carrier assembly holding one or more planet gears that intermesh with and are arranged around the periphery of the sun gear, and a ring gear that intermeshes with and surrounds the planetary gears; as well as an internal oil pump having a rotor unit and oil inlet and outlet.

The oil pump may be driven directly by the carrier. In this configuration, oil inlets and outlets may be located on the same side or on either sides of a rotor. In another configuration, the oil pump may be driven by the carrier indirectly through a single-stage gear reducer. The carrier may also drive other types of oil pumps, including gear and vane pumps.

The internal configuration of the gearbox and oil pump insures a very tight packaging of the full transmission assembly. In addition lubrication of the epicyclic/planetary gearbox and oil cooling and filtration may provide more control over oil viscosity and grade choice. The pump packaging may also be useful for electric vehicle ("EV") independent motor applications.

BRIEF DESCRIPTION OF THE DRAWINGS

The present invention is illustrated by way of example, and not by way of limitation, in the figures of the accompanying drawings in which.

DETAILED DESCRIPTION OF THE PREFERRED EMBODIMENTS

Figure 1:
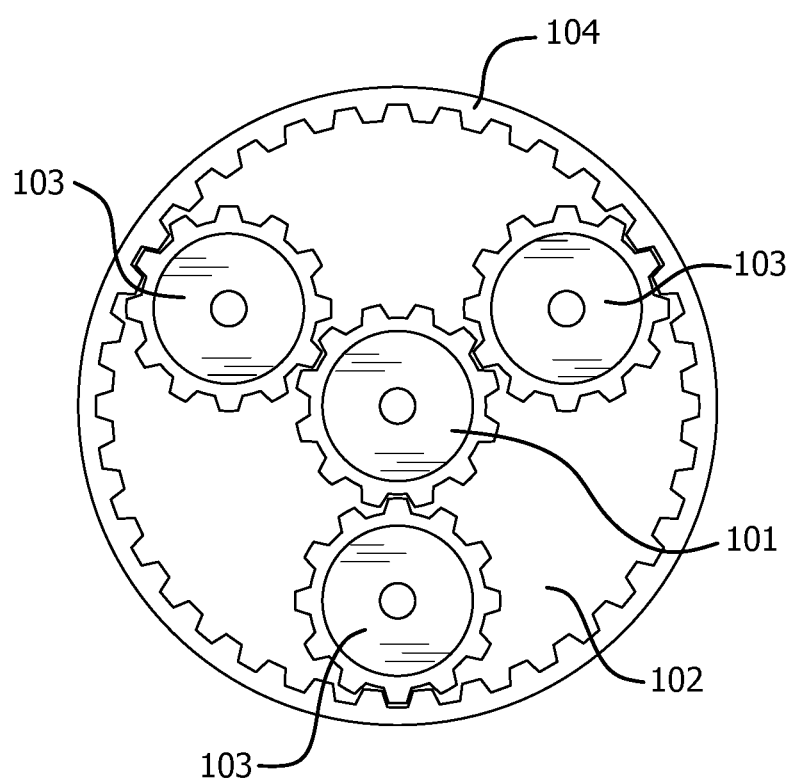
FIG. 1 is an example planetary gear system in an epicyclic/planetary gearbox.

The embodiments described herein include within the same packaging an epicyclic/planetary gearbox and an oil pump, where the oil pump may be driven directly by the gearbox, or in some embodiments, indirectly through a single-stage gear reducer. FIG. 1 depicts an example planetary gear system inside an epicyclic/planetary gearbox. The gearbox may be composed of a sun gear 101, a carrier 102 holding one or more planetary gears 103, and ring gear 104. Sun gear 101 may be driven by an input shaft of a transmission. Planetary gears 103 may intermesh with sun gear 101 and be spatially arranged around the periphery of sun gear 101. Planetary gears 103 may be mounted to carrier 102 that in turn may be operatively connected to an output shaft of a transmission. Ring gear 104 may intermesh with and surround planetary gears 103.

An oil pump may be used to build up oil flow and filter and cool down oil in order to provide adequate lubrication for gear meshings and bearings. In addition, the oil pump may help to scavenge the volume around the planetary gear in order to avoid splashing loss. The oil pump dimensions may range from 50-100 mm in diameter and 5-20 mm in thickness. Oil pumps may include trochoid, gear, and vane pumps.

The pump may be fed from an oil tank directly cast in the packaging or from any external supply. The oil may pass through a filtering unit and may be diverted proportionally to an oil cooler controlled by a solenoid valve or any mechanical thermoregulatory valve. A pressure relief valve may regulate the maximum pressure of the oil in the circuit. Oil can then be brought back to the carrier or directly into an oil jet to lubricate particular mechanical parts.

Figure 2A:
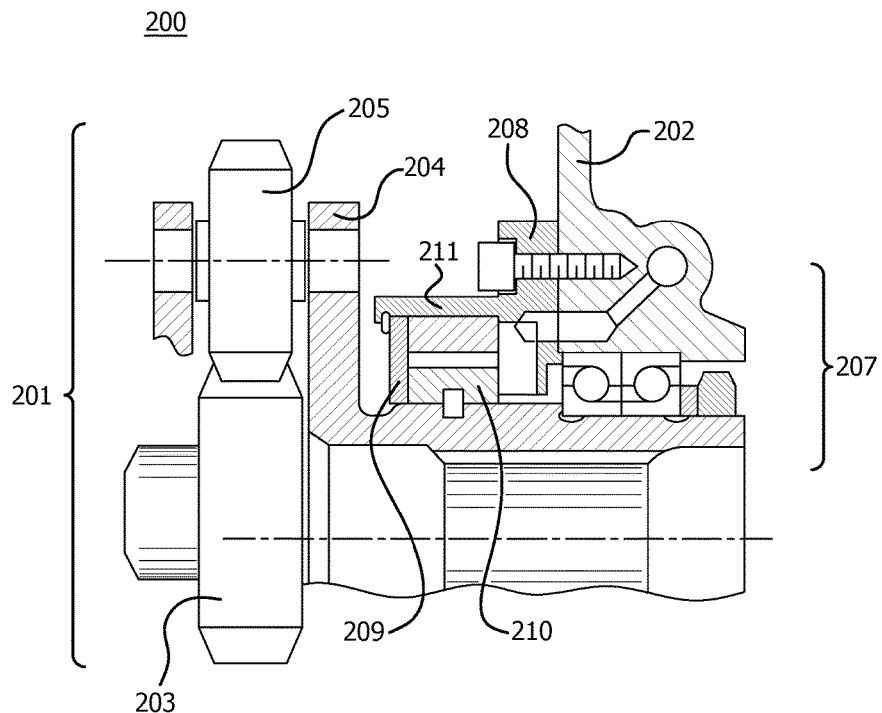
FIG. 2A is an example of a transmission packaging of an epicyclic/planetary gearbox with an internal integrated oil pump driving the carrier.
Figure 2B:
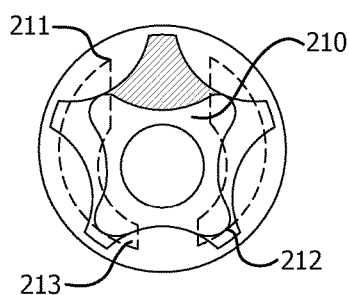
FIG. 2B is an enlarged view of a rotor unit of the oil pump of the example transmission packaging of FIG. 2A.

FIG. 2A depicts an example packaging of an epicyclic/planetary gearbox with an oil pump. The packaging 200 comprises a gearbox 201 and oil pump 207 concentric to gearbox 201. Gearbox 201 comprises a gearbox housing 202, a sun gear 203, a carrier 204 holding one or more planetary gears 205, and a ring gear (not depicted) that intermeshes and surrounds the planetary gears 205. Planetary gears 205 are spatially arranged around and intermesh with sun gear 203. Oil pump 207 comprises oil pump housing 208, a rotor unit 209 comprising an inner rotor 210 and outer rotor 211, and an oil inlet 212 and an oil outlet 213 (further depicted in FIG. 2B).

In this embodiment, carrier 204 may be directly driven by oil pump 207. Oil pump 207 may be of the trochoid type, in a similar manner as trochoid oil pumps found at the end of crankshafts in internal combustion engine applications. Thus, inner rotor 210 may be linked to carrier 204. Outer rotor 211 may be free to rotate in a carrier specifically devoted to oil pump 207, or in a carrier sharing some of its functions with carrier 204, or directly in a housing cast or machine in the gearbox housing 202. Oil inlet 212 and outlet 213 are located on the same side (i.e. the housing side). Thus, the oil may exit oil pump 207 back into housing 108 and can be redirected to carrier 204 for gearbox lubrication.

Figure 3A:
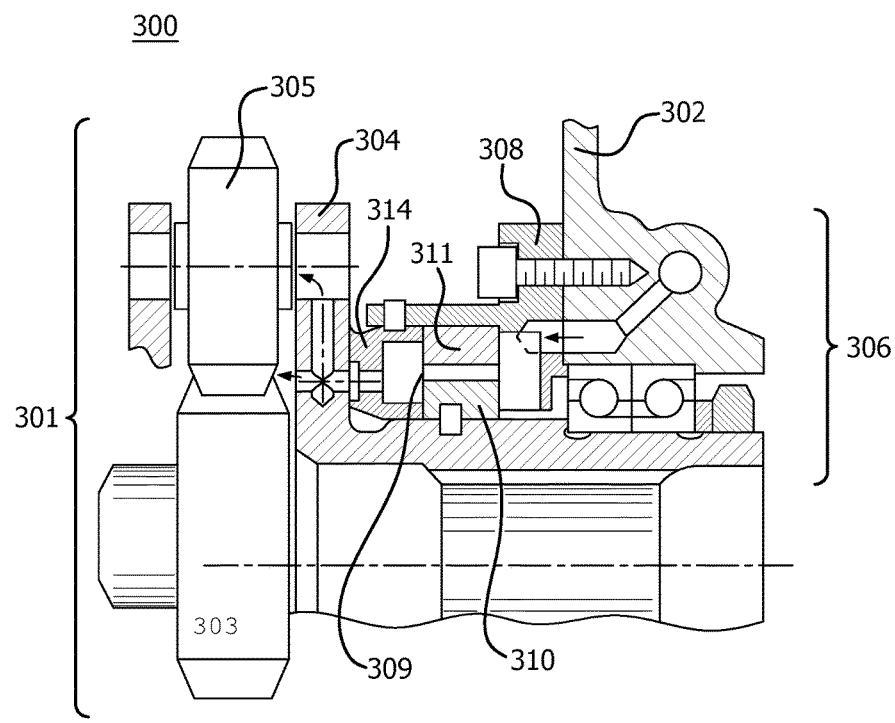
FIG. 3A is another example of a transmission packaging of an epicyclic/planetary gearbox with an internal integrated oil pump driving the carrier.
Figure 3B:
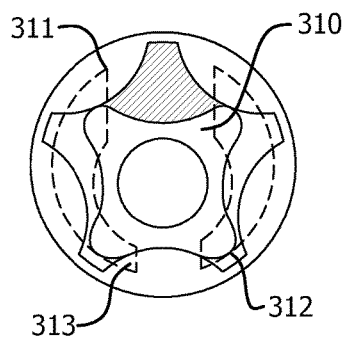
FIG. 3B is an enlarged view of a rotor unit of the example transmission packaging of FIG. 3A.
Figure 3C:
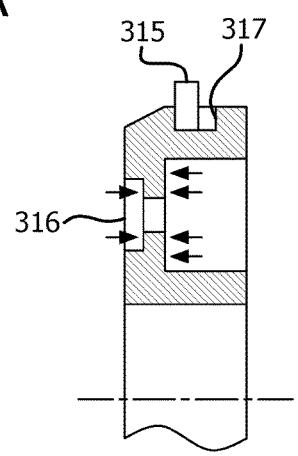
FIG. 3C is an enlarged view of a washer cover plate of the example transmission packaging of FIG. 3A.

FIG. 3A depicts another packaging configuration of the epicyclic/planetary gearbox and oil pump. The packaging 300 comprises a gearbox 301, an oil pump 306 concentric to gearbox 301, and a floating washer cover plate 314. Gearbox 301 comprises a main gearbox housing 302, a sun gear 303, a carrier 304 holding one or more planetary gears 305, and a ring gear (not depicted) that intermeshes and surrounds planetary gears 305. Planetary gears 305 are spatially arranged around and intermesh with sun gear 303. Oil pump 306 comprises oil pump housing 308, a rotor unit 309 comprising an inner rotor 310 and outer rotor 311, and oil inlet 312 and oil outlet 313 (further depicted in FIG. 3B). In this embodiment, oil pump 306 may be driven directly by carrier 304. Washer cover plate 314, as depicted in FIG. 3C, may be fixed on carrier 304 and comprises a pin 315, an oblong groove 317 and a feeding groove 316. Pin 315 may be designed in a way to allow washer cover plate 314 to move axially, but to prevent rotation with rotor unit 309. For example, pin 315 is guided into oblong groove 317 to allow washer cover plate 314 to move axially but not rotate.

Because washer cover plate 314 may be fixed, friction can occur between the washer cover plate 314 and carrier 304. Oil may therefore be introduced to relieve friction. In this embodiment, oil inlet 312 and outlet 313 are located on both sides of rotor unit 309. Oil may enter from the side of main gearbox housing 302 and exits on the side of carrier 304. The surface on right side of feeding groove 316 may be larger than the left side. Thus, differential flow may act towards the left side of feeding groove 316, providing lubrication and reducing friction. Washer cover plate 314 may also be pressed against carrier 304 to ensure proper sealing. The ring gear may also be located on the side of rotor unit 309 and may act as a pump outlet port and also as a thrust washer or sealing, which feeds oil to carrier 304.

The ring gear may have a channel through its periphery to provide oil to a pressure relief valve (not depicted) in order to control the oil pressure. Controlling oil pressure in inner rotor 310 ensures keeping a balanced force acting towards carrier 305. This provides sealing for high pressure oil at minimum friction loss and aids in the ability of carrier 305 to drive the oil pump.

Figure 4A:
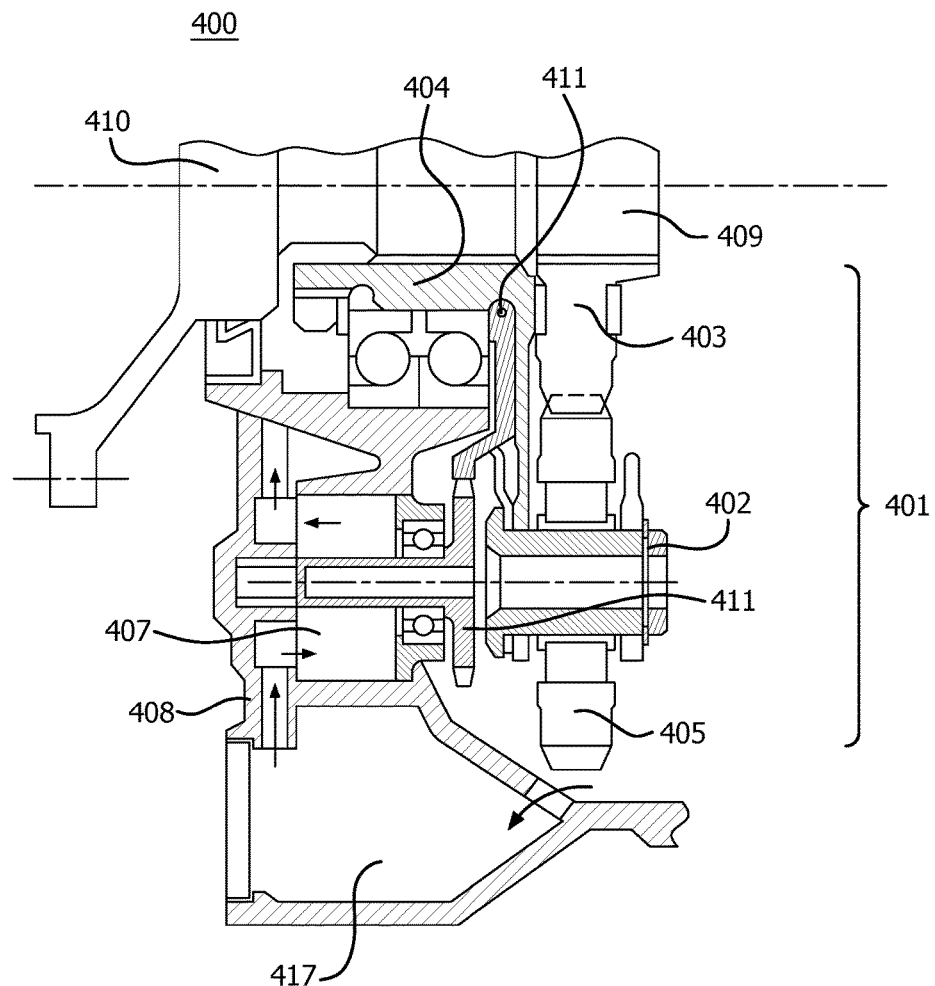
FIG. 4A is an example of a transmission packaging of an epicyclic/planetary gearbox with an internal integrated oil pump using a single stage gear reducer.
Figure 4B:
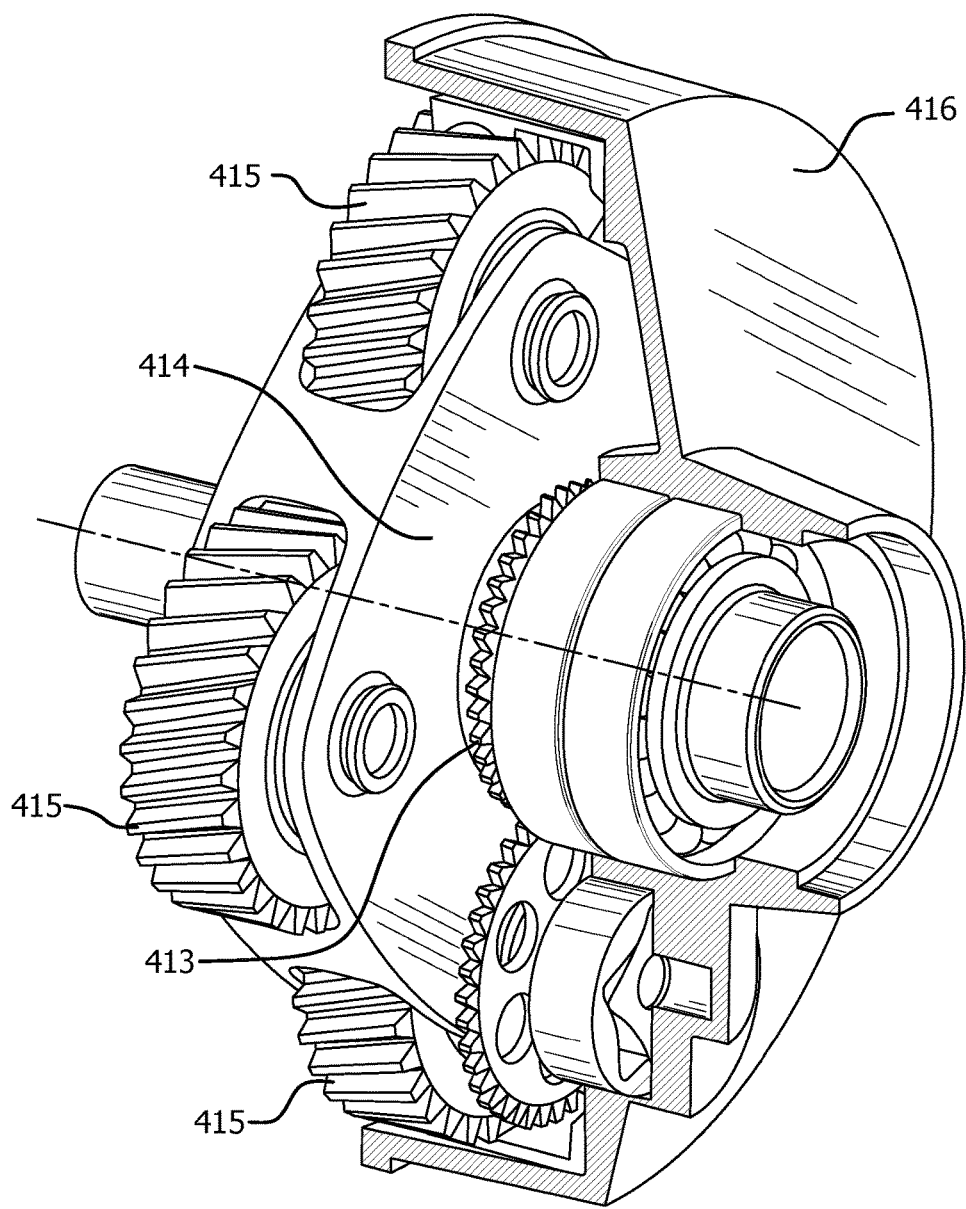
FIG. 4B is an example single stage gear reducer of the example transmission packaging of FIG. 4A.

FIGS. 4A and 4B depict another packaging that includes a stage gear reducer. The packaging 400 comprises a gearbox 401, an oil pump 407, an oil tank 417, and a single-stage gear reducer 411. Gearbox 401 comprises a gearbox housing 402, a sun gear 403, a carrier 404 holding one or more planetary gears 405, and a ring gear (not depicted) that intermeshes and surrounds planetary gears 405. Planetary gears 405 are spatially arranged around and intermesh with sun gear 403.

Oil pump 407 comprises oil pump housing 408, an oil inlet 409 and an oil outlet 410. Oil pump 407 may be located at any angular position relative to planetary gears 405 (including above, below, to the side, or at any other angle). In an automotive application, oil pump 407 may be located at the lowest possible portion of gearbox housing 402 to improve scavenging, avoid pump churning, and also to lower the center of gravity of the packaging 400 in the vehicle.

Gearbox 401 and oil pump 407 are not located on the same concentric axis. As a result, the oil pump may be driven indirectly through carrier 404 by single-stage gear reducer 411. FIG. 4B depicts an example single-stage gear reducer used in the packaging in FIG. 4A. Single-stage gear reducer 411 comprises a single-stage reducer sun gear 413, a single-stage reducer carrier 414 holding one or more single-stage reducer planetary gears 415, and a single-stage reducer housing 416 that encloses half of single-stage reducer carrier 414. Single-stage reducer planetary gears 415 are spatially arranged around and intermesh with single-stage reducer sun gear 413.

Although features and elements are described above in particular combinations, each feature or element can be used alone without the other features and elements or in various combinations with or without other features and elements.

What is claimed is:

1. A packaging for a transmission, comprising:
   a gearbox comprising:
      a gearbox housing,
      a sun gear,
      a carrier holding one or more planetary gears that intermesh with and are spatially arranged around the periphery of the sun gear, and
      a ring gear that intermeshes with and surrounds the planetary gear; and
   an oil pump contained in the housing and configured to be driven by the carrier, wherein the oil pump is directly driven by the carrier.

2. The packaging of claim 1, wherein the oil pump comprises:
   an oil pump housing,
   a rotor unit that includes an inner rotor and outer rotor, and
   an oil inlet and an oil outlet.

3. The packaging of claim 2, wherein the oil inlet and the oil outlet are located on the same side of the rotor unit.

4. The packaging of claim 2, wherein the inner rotor is rotationally linked to the carrier.

5. The packaging of claim 1, wherein the oil pump is a trochoid pump.

6. A packaging for a transmission, comprising:
- a gearbox comprising:
  - a gearbox housing,
  - a sun gear,
  - a carrier holding one or more planetary gears that intermesh with and are spatially arranged around the periphery of the sun gear, and
  - a ring gear that intermeshes with and surrounds the one or more planetary gears; and
- an oil pump comprising:
  - an oil pump housing,
  - a rotor unit comprising an inner rotor and an outer rotor,
  - an oil inlet, and an oil outlet, wherein the oil inlet is located on one side of the rotor unit and the oil outlet is located on the opposite side of the rotor unit; and
  - a washer cover plate pressed against the carrier;
- wherein the oil pump is contained in the packaging and is configured to integrate with the gearbox.

7. The packaging of claim 6, wherein the oil pump is directly driven by the carrier.

8. The packaging of claim 6, wherein the washer cover plate is fixed to the carrier.

9. The packaging of claim 6, wherein the washer cover plate includes:
- a pin configured to provide axial movement of the washer cover plate, and
- a feeding groove configured to provide differential flow of oil for lubrication and friction reduction.

10. The packaging of claim 9, wherein the pin prevents rotation of the washer cover plate with rotation of the rotor unit.

11. The packaging of claim 9, further comprising:
- an oblong groove disposed in an outer periphery of the washer cover plate, wherein the pin is fixedly connected at one end to the oil pump housing and is disposed at least partially inside the oblong groove at an opposite end, and wherein the disposition of the pin provides the axial movement of the washer cover plate and prevents rotation of the washer cover plate with rotation of the rotor unit.

12. The packaging of claim 9, wherein features arranged in the carrier direct oil from the feeding groove to an area between the sun gear and the one or more planetary gears.

13. The packaging of claim 6, wherein the ring gear is located on the side of the rotor unit.

14. The packaging of claim 6, wherein the pump is a trochoid pump.

15. A packaging for a transmission, comprising:
- a gearbox comprising:
  - a gearbox housing,
  - a sun gear,
  - a carrier holding one or more planetary gears that intermesh with and are spatially arranged around the periphery of the sun gear, and
  - a ring gear that intermeshes with and surrounds the planetary gear;
- an oil pump;
- an oil tank; and
- a single stage gear reducer, comprising:
  - a reducer sun gear,
  - a reducer carrier holding one or more reducer planetary gears that intermesh with and are spatially arranged around the periphery of the reducer sun gear, and
  - a reducer housing that encloses a portion of the reducer carrier and the reducer planetary gears;
- wherein the oil pump and oil tank are contained in the packaging, and the oil pump is configured to integrate with the gearbox and single stage gear reducer.

16. The packaging of claim 15, wherein the oil pump comprises:
- an oil pump housing, and
- an oil inlet and an oil outlet.

17. The packaging of claim 15, wherein the oil pump is driven indirectly by the carrier through the single stage gear reducer.

18. The packaging of claim 15, wherein the oil pump is located at a lowest possible portion of the single stage gear reducer housing.

19. The packaging of claim 15, wherein the oil pump is a trochoid pump.

20. The packaging of claim 15, wherein the gearbox and the oil pump are arranged eccentrically to one another.

* * * * *